Feb. 17, 1970    W. R. ODERTHAL    3,496,052
GRID CORE PANEL
Filed Feb. 12, 1965    3 Sheets-Sheet 1
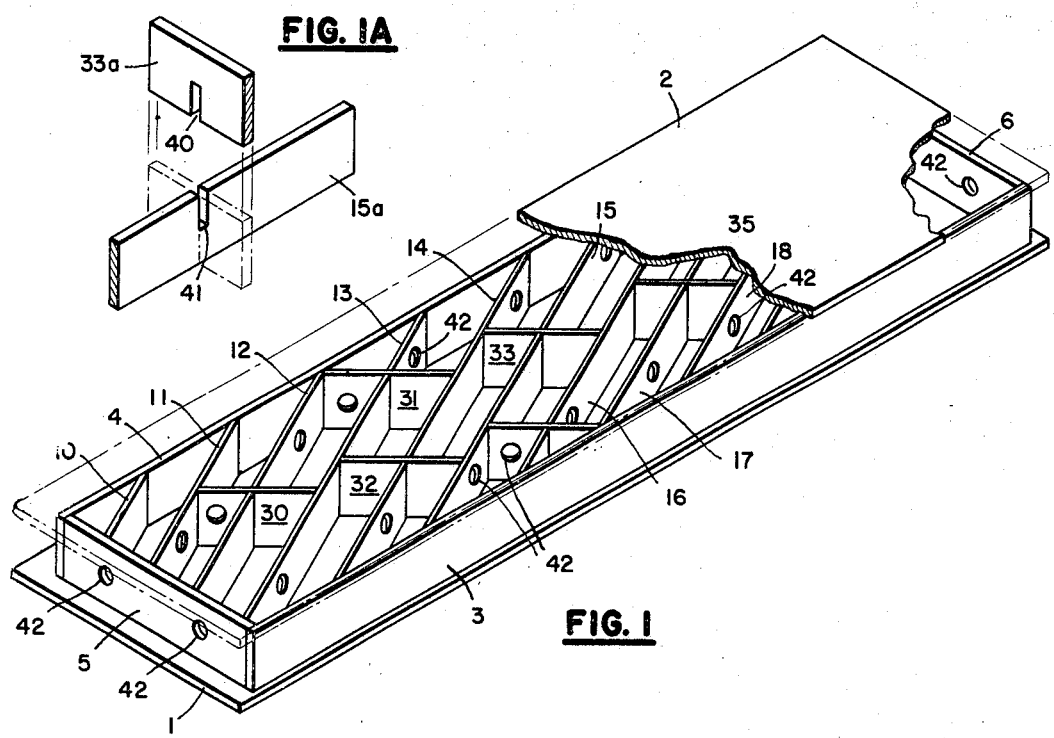
FIG. 1A
FIG. 1
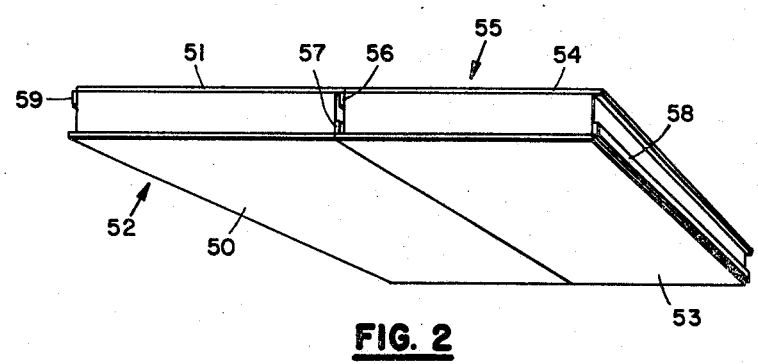
FIG. 2
WARNER R. ODENTHAL    INVENTOR
By James M. Heilman, Att'y Feb. 17, 1970     W. R. ODERTHAL     3,496,052
GRID CORE PANEL
Filed Feb. 12, 1965     3 Sheets-Sheet 2
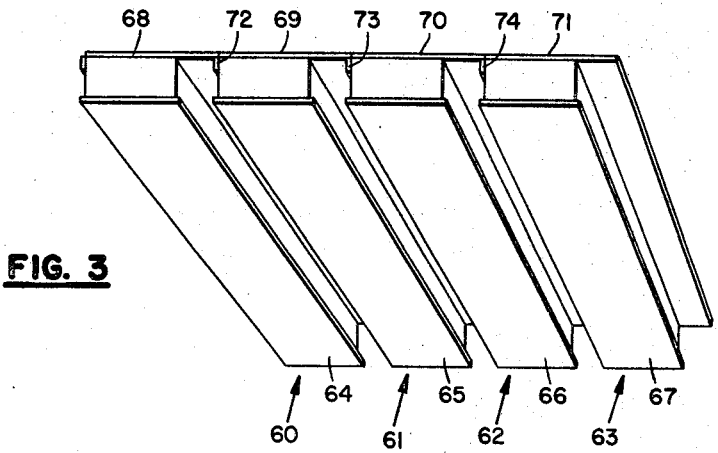
FIG. 3
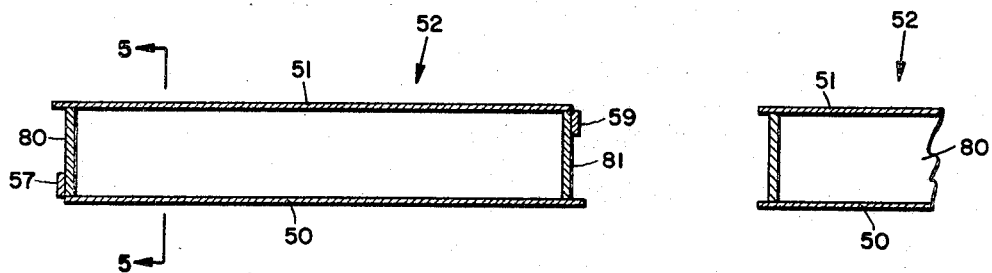
FIG. 4     FIG. 5
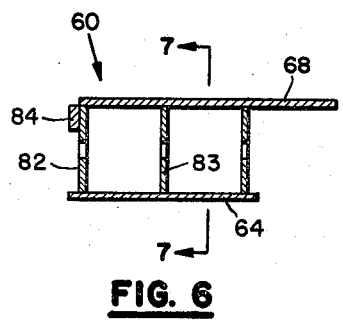     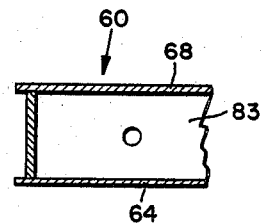
FIG. 6     FIG. 7
WARNER R. ODENTHAL     INVENTOR
By James M. Heitman, Atty

United States Patent Office 3,496,052
Patented Feb. 17, 1970

3,496,052
GRID CORE PANEL
Warner R. Odenthal, Orinda, Calif., assignor to United States Plywood Corporation, New York, N.Y., a corporation of New York
Filed Feb. 12, 1965, Ser. No. 432,290
Int. Cl. B32b 3/02; E04c 2/36
U.S. Cl. 161—44                               2 Claims

ABSTRACT OF THE DISCLOSURE

A lightweight structural element which can be easily fabricated, readily transported, and simply positioned and installed in a building comprising an open grid core having outer facing elements. The outer facing elements may be provided in overhang relation to each other and a nailing strip may be secured to at least the outer surface of at least one side spacing element so that the panel assembly may be secured to an adjacent similar panel assembly. In addition, the facing elements may be plywood panels formed of plies constituting a difference in thickness for said facing elements in the panel assembly.

Figure 8:
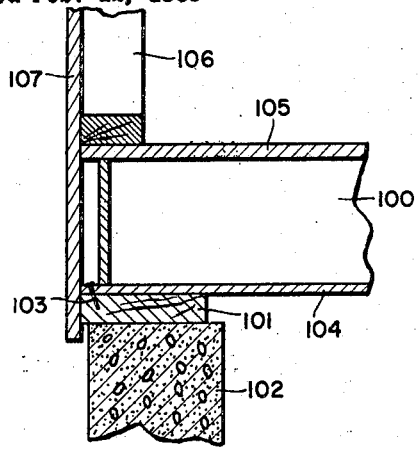

The present invention is broadly concerned with a grid core panel. The invention is more particularly concerned with a structural element suitable for multiple use or uses, which comprises a plywood assembly. In essence, the structural element comprises two plywood panels, as skins, rigidly affixed one to the other preferably by a plywood grid core element. The overall mechanical strength and wearability of the assembly combination vastly exceeds the mechanical strength and wearability of individual panels.

In the building and related arts there exists a distinct need for a lightweight modulus or structural element which can be readily transported and easily positioned or installed in the building or structure for which it is designed to be used. There also exists a real need in the building trades for a construction element which is of light weight; which has a high thermal transmission resistance; which has stability at varying moisture conditions so as to resist squeaky floors; which has high rigidity; which is readily adaptable for the installation of wiring, heating ducts and plumbing; and which may be easily installed.

As a result of this need, many suggestions have been made and many structural elements have been used. However, these structural elements known in the art do not possess the desired mechanical strengths; or if the mechanical strengths are satisfactory, then these known structural elements have undesirable high weights per unit of surface. Also known structural elements in the art possess other undesirable characteristics. They are difficult to erect into position; they do not lend themselves to the ready installation of heating ducts, electrical wiring and the like, and in many instances, these known structural elements have undesirable thermal characteristics.

The plywood grid assembly or structural element of the present invention, as pointed out heretofore, comprises two plywood panels, as skins, rigidly affixed one to the other by means of a cross grid, preferably a cross grid, the members of which are diagonal across the back faces of the respective plywood panels.

The present assembly, or panels, by the use of closely spaced plywood web members of both the "closed" and "open" core systems, greatly stiffen and strengthen the skins of the panels. This represents an extremely important advantage of the grid core over known and conventional units, particularly for floor and roof construction, such as the standard stressed-skin panel wherein plywood skins are glued to kiln dried lumber stringers usually spaced 16" o.c. Usually in the "open" core panels the webs are 8" o.c. and in the "closed" panels the webs are 12" o.c. Thus, great strength is imparted to the skins, particularly if the web elements are diagonal to the longitudinal axes of the skins. While it is preferred that the web elements be diagonal, under certain conditions of use these web elements may be parallel and perpendicular to the longitudinal axes of the skins or axis of the skin, "open core." It is also preferred that the grid core be encased by two lateral sides and top and bottom members, which are positioned between the respective panels along or close to the edges thereof. This structural assembly has a mechanical strength greatly in excess of either of the two individual plywood panels.

The structural assembly has many other very desirable characteristics. It is relatively light per unit of surface and can be readily transported and erected into position at the site. It is relatively easy and simple to install heating vents, electrical equipment and other utilities, such as, plumbing and the like. Furthermore, the transmission of heat can be substantially eliminated by the insertion of insulating material between the respective panels. However, due to the fact that the cross grid created many dead air spaces within the respective panels, this per se is an effective insulating medium and thus the element can be readily used in housing and other structural elements.

The thickness of the respective face panels may be of any thicknesses, such as, for example, from about ¼" to ¾" and greater. The number of plies may also be varied, but preferably these are either a 3 or 5 ply unit.

The size of the face panels, likewise, may be varied appreciably. However, it is preferred that the size of the panels be 2' or 4' wide x the required length (span). This span may be 4' to 10' to 16' and higher. The distances between the respective face panels or skins likewise may be varied appreciably as, for example, from 2" to 4" to 8" and higher.

The grid core is preferably a plywood grid core having three to five plies, although under certain conditions more plies may be used. The thicknesses of the plies of the core may vary, as for example, from ¼" to ¾", but are preferably about ¼" to ½" thick. The distances or spaces between the laminated plies of the core may vary, from about 2" to 8" to 16" and higher.

The structural element of the present invention may be readily understood by reference to the drawings illustrating embodiments and adaptations of the same. FIGURE 1 shows in some detail a typical grid core panel. FIGURE 2 illustrates a closed type of panel for ceiling installation, white FIGURE 3 shows an open style panel for non-exposed construction. FIGURE 4 is a cross-sectional view showing the over extensions and nailer strips, while FIGURE 5 shows an end section view. FIGURE 6 is a cross section of an open style panel, while FIGURE 7 illustrates the end section.

FIGURES 8, 9, 10, and 11 illustrate techniques and modificatons of positioning the unit with respect to an outside wall. FIGURE 12 shows a technique of using the units or elements in a party type wall.

Referring specifically to FIGURE 1, face panels or skins 1 and 2 are shown rigidly affixed to one another by means of a core grid positioned between the respective panels and bonded by hot-press gluing to the face skins. Panel 2 is cut away in order to clearly illustrate one of the several types of grid cores. The core, in essence, comprises members 10, 11, 12, 13, 14, 15, 16, 17, and 18 which are diagonal with respect to the longitudinal axes of the panels. Cross core members running perpendicularly to these heretofore mentioned are designated by numerals 30, 31, 32, 33, 34, and 35. Sides 3 and 4 are shown positioned between the respective skins 1 and 2 along the lateral sides thereof. End members 5 and 6 are shown positioned along the top and bottom of, and between the respective faces 1 and 2.

FIGURES 1A shows a desirable method of fabricating the grid. Element 33a has a slot 40 extending from its lower edge while element 15a has a slot 41 extending from the top thereof so as to permit secure seating of cross member 33a with respect to member 15a.

It is to be noted that cross element 30 seats or meshes in element 12 as described with respect to FIGURE 1A, and abuts against the sides of elements 11 and 13. Cross element 31 seats in element 13 and the ends of element 31 abut against the sides of elements 12 and 14. This is the preferred type of construction.

Holes 42 are provided in all cross grid members and end members in order to permit the stringing of electrical cable or other type of utility necessities. These holes also provide means for the bonding solvent during pressing to escape, and also provide means to apply a vacuum to the entire interior to secure a better bond between the core and the faces.

Thus, in the construction of the assembly the respective skins are applied to the grid, the edges of which are covered with adhesive and then a vacuum is applied by exhausting through the holes in elements 5 and/or 6. This technique gives a successful "edge glue" of the grid to the respective skins. In the past it was felt impossible to "edge glue" thin plywood and obtain both the necessary shear transfer and a glue line which would pass the industry's quality control tests for durability.

It is preferred that the grid members be at an angle of about 20 to 60°, such as 30° with respect to the longitudinal axes of the panels.

FIGURE 2 illustrates elements 52 and 55 positioned along the ceiling and secured to the supports by suitable means. Skins 50 and 51 of panels 52 are shown abutting skins 53 and 54 of panel 55, respectively. Skin 53 overextends the side of panel 55 and nests under strip 57 of panel 52. Thus, a very desirable tight engagement is secured between the respective panels. Skin 54 overextends the opposite side of panel 55 and is adapted to nest on a strip of an adjacent panel (not shown).

A strip 58 extends along the side of panel 55 and is adapted to seat above the over extending face or skin of an adjacent panel (not shown). Lower skin 50 of unit 52 overextends the side of unit 52 and is adapted to seat underneath the strip of an adjacent panel. Strip 59 extends along the side of panel or element 52 and is adapted to seat underneath the overextending upper surface of an adjacent panel (not shown). Thus the structural grid elements of the present invention for ceiling installation present a very strong and pleasingly delightful type of construction. By the method of using running strips and overextending face skins a very snug and tight fit is secured between adjacent panels. These elements also due to their unique construction may be readily and easily installed.

A pleasing type of ceiling construction or ceiling installation is illustrated in FIGURE 3 wherein four panels, 60, 61, 62 and 63, are shown. Panel 60 has an overextending upper skin 68. Panel 61 has an overextending upper skin 69, panel 62 has an overextending skin 70, while panel 63 has an oxerextending upper skin 71. Skin 68 of panel 60 nests on nailing strip 72 extending along the side of panel 61 while skin 69 seats and nests on nailing strip 73 running along the side of panel 62 while skin 70 seats and nests on strip 74 running along the side of panel 63. This type of construction is very pleasing to the eye and is also very strong and durable. The lower skins 64, 65, 66 and 67 of the respective panels 60, 61, 62 and 63 are uniform and symmetrically positioned.

The extent the upper skins overextend the respective panels may be widely varied; if, for example, the lower skin is 8" wide, the upper skin may overextend, for example, from about 2" to 10". A pleasing effect is to have the upper skin overextend the panel an amount equivalent to the width of the lower skin. It is obvious that many variations and adaptations and combinations may be employed.

FIGURES 4 and 5 show in some detail the construction of panel 52 of FIGURE 2. Similar elements are similarly numbered. Nailer strips 57 and 59 positioned along the sides of the grid core panel 52 may be of any dimension as, for example, about ⅝" thick and about 1' wide. The overall width of the panel may be about 48" with the skins overextending about 1¼". FIGURE 5 is an end view showing other desirable dimensions. The longitudinal sides 80 and 81 are also illustrated in FIG. 4.

FIGURES 6 and 7 illustrates in some detail the open type of panel described with respect to FIGURE 3. Similar elements are similarly numbered. It can be seen that overextending upper surface 68 extends about 8" wherein the overall width dimension is about 24". Side 82 is shown along with nailing strip 84. The grid core is also illustrated as 83. FIGURE 7 is an end view section of FIGURE 6. The lower surface 64 of panel 60 is also shown in the end section.

FIGURES 8 to 12 illustrate a number of modifications of utilizing the grid core assembly. These figures are given for illustrative purposes only and are not to be construed as limiting the scope of application of the grid core. Similar elements will be similarly numbered, and the difference pointed out from figure to figure.

FIGURE 8 shows a grid core panel 100 positioned on a wood plate member 101 which in turn is supported by a foundation wall 102. Core 100 is secured to plate 101 by means of fastener 103 which passes through the overextending lower skin 104. It is to be noted that lower skin 104 is thinner than upper skin 105. For example, if the upper skin is about ¾" thick, the lower skin can be about ¼ to ½" thick and the desired strength qualities will be secured. Studding 106 is positioned on top of skin 105 and exterior wall 107 affixed to the studding.

Figure 9:
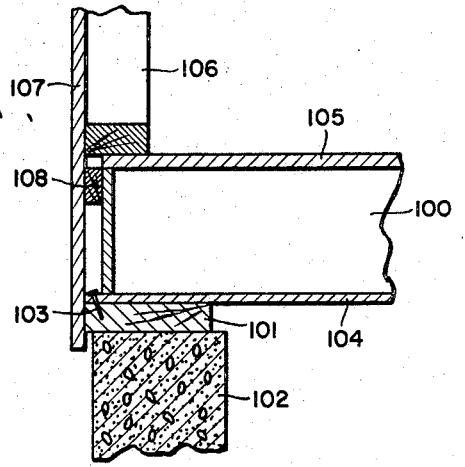
Figure 10:
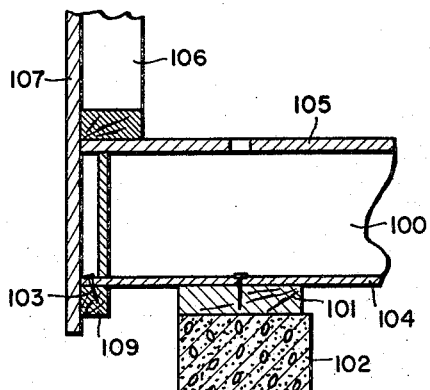

FIGURE 9 is similar to FIGURE 8 except that skin 105 does not overextend. A strip 108 abuts against wall 107. FIGURE 10 is similar to FIGURE 8 except that grid panel 100 overextends foundation wall 102. Exterior wall 107 has a nailing strip 109 along its inside lower edge and lower skin 104 is securely affixed thereto by nail or equivalent means 103.

Figure 11:
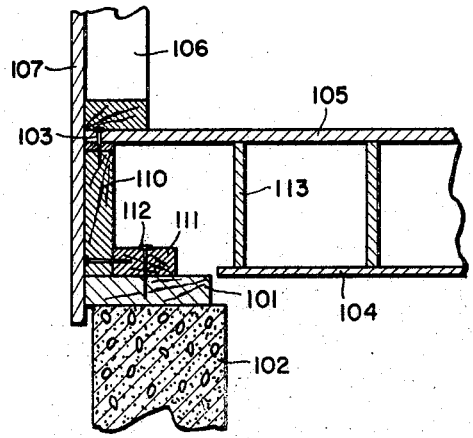
Figure 12:
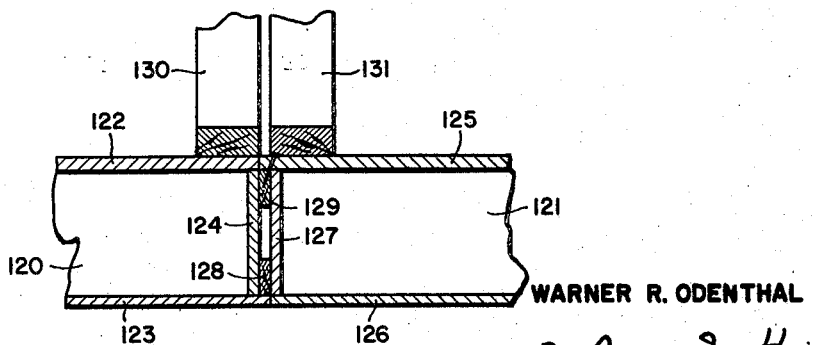

FIGURE 11 shows a modification wherein skin 105 substantially overextends and seats on strip 110 and is affixed thereto by nail 103. Strip 111 is affixed to strip 110 and is also affixed to 101 by means of nail 112. This type of construction provides an open area between side 113 of the panel and wall 107 for installation of facilities such as heating or transfer ducts. FIGURE 12 shows one method of getting a snug adjustment between two abutting panels 120 and 121. Skins 122 and 123 overextend side 124. Skins 125 and 126 do not overextend side 127. Nailing strips 128 and 129 are attached to 127 and seat beneath and over the overextending strips and are securely fastened thereto by nails or equivalent means. Partitions or walls 130 and 131 are supported by the top skins. A single partition may be utilized.

As mentioned, the process or technique of manufacture is important. The web members should be cut preferably with less than ⅟₆₄" tolerance. The saw cuts in the web members must be very precise, i.e., the edges cannot be ragged thereby reducing the bondable area of the parallel grain. This is accomplished by a special "slitting" machine which employs a series of special saw blades mounted on a common shaft with highly accurate sleeves separating the saw blades to the desired dimensions. Preferred glues are of the resorcinol and melamine type.

Thus, the structural element of the present invention possesses great structural strength and may be used in a variety of applications. The interlocked plywood honeycomb cell structure has a high strength particularly with respect to its weight ratio. The element also eliminates flue drafts, thereby limiting fire spread and increasing the safety factor. The element will allow increased span limits and, as pointed out heretofore, seals in dead air, thereby providing thermal resistance. Furthermore, the element per se is an excellent sound deadening unit and will resist sound transmission. Also, being constructed entirely of plywood, the assembly is dimensionably stable and shrink-proof. The panel can be machined to exacting tolerances even when the panels are used on two or more stories and roof of a building. There is no accumulation of vertical shrinkage such as is experienced in conventional frame construction.

The element is particularly desirable for a prefab installation panel to be used in houses and buildings, freight cars, truck and trailer panels, and the like. It is to be noted that in present day construction, wood joists are placed 16 inches on center and covered with plywood on the top and ceiling materials on the bottom. It is within the concept of the present invention to place beams on 4' or greater centers using the grid core of the present invention as described. Obviously, the plywood panels of the present invention are very excellent for use in floor and roof construction to secure the desired insulation with respect to thermal capacity and the like. Other uses for the structural elements of the present invention are bridges, floating pontoons and, as a matter of fact, are very excellent in all conceivable types of construction. The structural element of the present invention can be used as a floor structure, whereby they are placed on supporting beams abutting one another, thereby eliminating all floor nailing.

The embodiments of the invention in which an exclusive property or privilege is claimed are defined as follows:

1. A structural wood element which comprises in combination a first panel, a second panel substantailly of equal length but substantially shorter in width than said first panel and offset in relation to said first panel so that each panel will be provided with an engageable overhang, three side spacing elements secured between said panels and closely adjacent the edges thereof, a fourth side spacing element closely adjacent the edge of said second shortened panel, but spaced inwardly from the edge of said first panel, a nailing strip secured on one of said spacing elements adjacent said larger first panel, whereby the overhang from the adjacent larger panel may be secured to an adjacent panel assembly to make a rigid structure, and a grid core positioned between said offset panels so that said grid core is perpendicular to the plane of the said panels, said grid core being rigidly adhered to said panels.

2. A wood element as set forth in claim 1 wherein the first panel is approximately ¾" thick comprising a plywood of 5 plies, the second panel is approximately ¼" thick comprising a plywood of 3 plies, the grid core is ¼" thick, and the spacing between the elements of the core varies in the range of 2" to 16" while being in the range of 2" to 8" in depth, and the said panels being in the range of 4 ft. to 16 ft. in length and 2 ft. to 4 ft. in width.

References Cited

UNITED STATES PATENTS

| | | | |
|---|---|---|---|
| 2,108,479 | 2/1938 | Elmendorf | 52—615 |
| 2,295,248 | 9/1942 | Wittner. | |
| 2,309,389 | 1/1943 | Goodman. | |
| 2,363,233 | 11/1944 | Dalton. | |
| 2,453,326 | 11/1948 | Lambert | 52—593 XR |
| 3,082,489 | 3/1963 | Douglas | 52—615 XR |
| 3,284,978 | 11/1966 | Roeder | 52—629 XR |
| 1,887,814 | 11/1932 | LeGall | 161—68 XR |
| 2,385,352 | 9/1945 | Davis | 156—156 |
| 2,700,632 | 1/1955 | Ackerlind | 156—285 XR |

ROBERT F. BURNETT, Primary Examiner

W. A. POWELL, Assistant Examiner

U.S. Cl. X.R.

52—593, 615; 156—285; 161—68, 69

UNITED STATES PATENT OFFICE
CERTIFICATE OF CORRECTION

Patent No. 3,496,052 February 17, 1970

Warner R. Odenthal

It is certified that error appears in the above identified patent and that said Letters Patent are hereby corrected as shown below:

In the heading to the printed specification, lines 3 and 4, "assignor to United States Plywood Corporation, New York, N. Y." should read -- U. S. Plywood-Champion Papers Inc., New York, N. Y. --.

Signed and sealed this 12th day of January 1971.

(SEAL)
Attest:

Edward M. Fletcher, Jr.
Attesting Officer

WILLIAM E. SCHUYLER, JR.
Commissioner of Patents